United States Patent [19]

Machefert-Tassin

[11] 3,941,062

[45] Mar. 2, 1976

[54] ELECTROMAGNETIC SYSTEM FOR TRANSVERSELY ALIGNING RAILWAY ROLLING STOCK ON RAILS

[75] Inventor: Yves Machefert-Tassin, Saint-Cloud, France

[73] Assignee: Societe M.T.E., Paris, France

[22] Filed: Sept. 17, 1974

[21] Appl. No.: 506,688

[30] Foreign Application Priority Data
Sept. 20, 1973   France ........................... 73.33744

[52] U.S. Cl. ............................ 105/157 R; 105/77
[51] Int. Cl.² ........................................ B61D 1/00
[58] Field of Search. 104/148 SS, 148 MS, 148 LM; 105/77, 78, 73, 157 R, 164, 175 A

[56] References Cited
UNITED STATES PATENTS
1,960,595   5/1934   Poe ....................................... 105/77
3,842,750   10/1974   Miericke ........................ 104/148 SS FOREIGN PATENTS OR APPLICATIONS
482,589   3/1938   United Kingdom .................... 105/78
1,010,184   7/1958   France ................................. 105/77

Primary Examiner—John J. Love
Attorney, Agent, or Firm—Cameron, Kerkam, Sutton, Stowell & Stowell

[57] ABSTRACT

A system for transversely aligning railway rolling stock on the rails including electromagnets arranged outside the wheel base of the rolling stock axles. The electromagnets are transversely aligned to the rails and separated from the rails by air-gaps. Movement of the rolling stock from off-centre produces a restoring force from the magnets.

4 Claims, 6 Drawing Figures

FIG:1

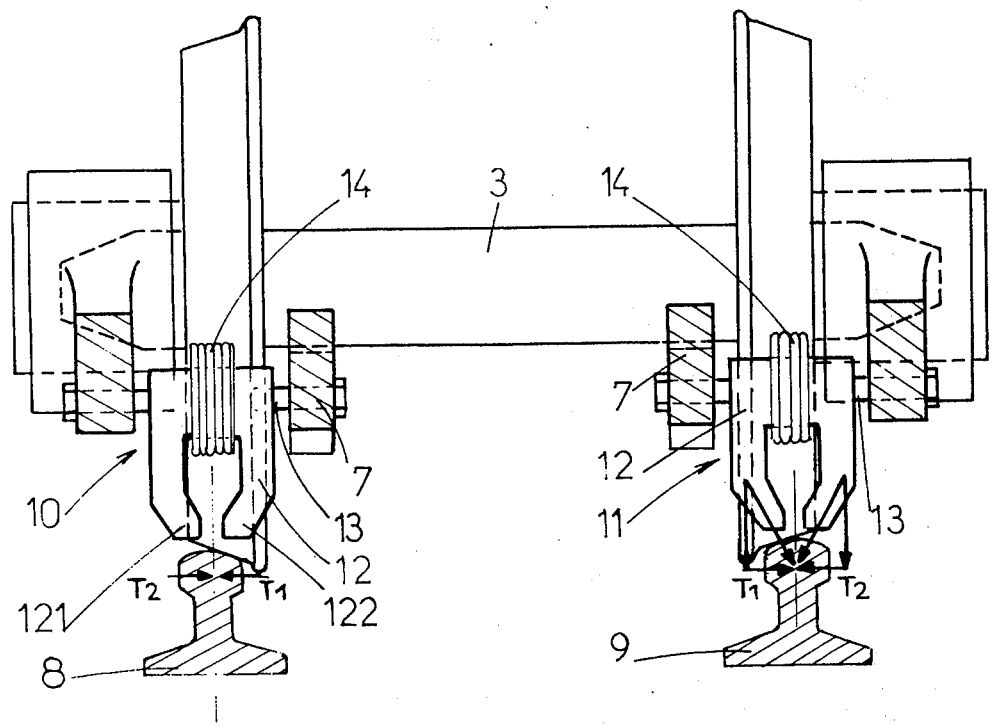
FIG:3
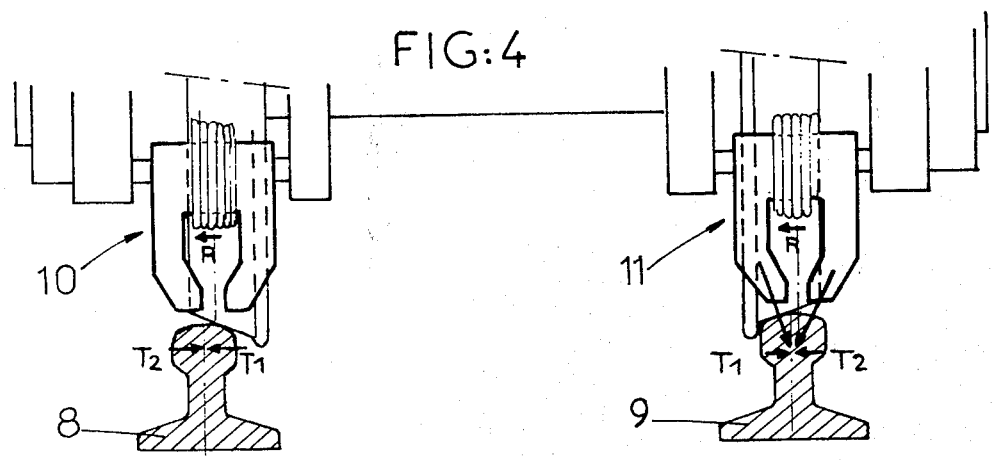
FIG:4

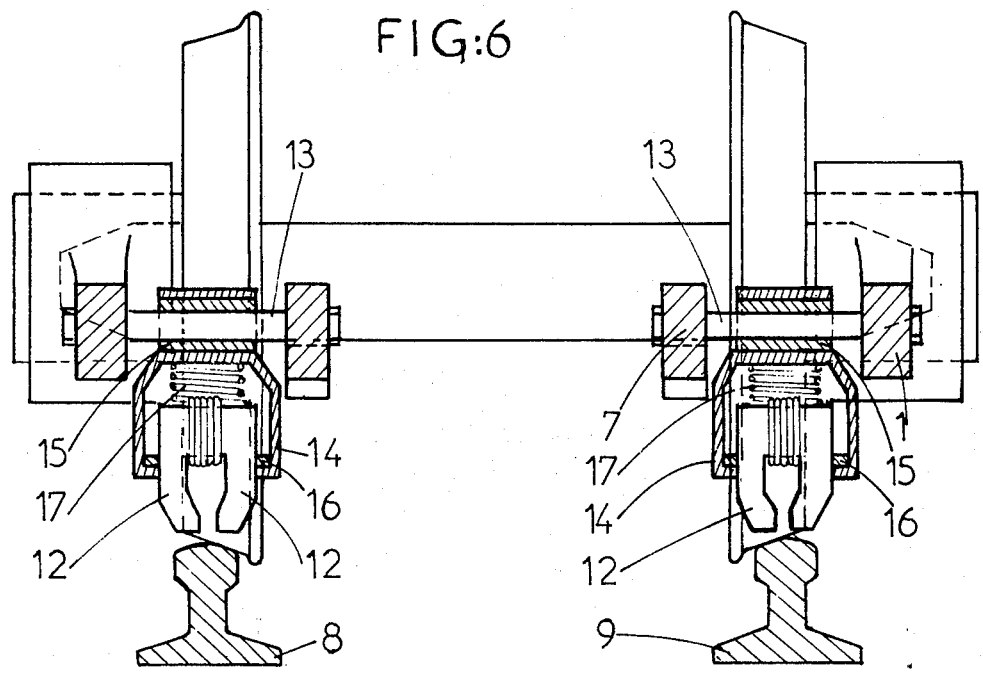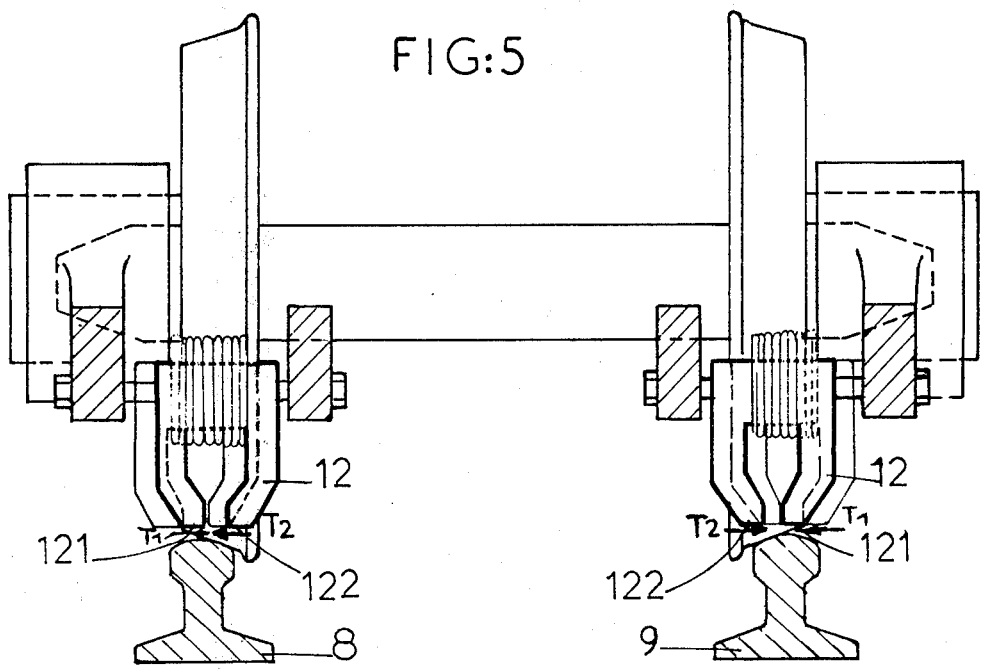

ELECTROMAGNETIC SYSTEM FOR TRANSVERSELY ALIGNING RAILWAY ROLLING STOCK ON RAILS

The present invention relates to electromagnetically guiding railway rolling elements of, for example, the bogie type.

The rolling element is provided with apparatus intended for transverse guiding of the element when running at high speed.

The high-speed travel of railway trains poses problems which are difficult to solve as regards the performance of rolling elements, for example, bogies. Above a certain speed, known as the critical speed, the bogie is subject to lateral movements known as nosing, of an amplitude limited by the play between wheel-flanges and rails, but introducing high stresses which for these reasons are a threat to safety. Factors which determine the critical speed are known.

One possible way of increasing the critical speed would be to modify the conicity of the tyres and the profile and slope of the rails, but these factors are difficult to influence. It is highly desirable to minimize wheel-wear and to retain a wheel-profile close to the initial profile, by avoiding contact between the flanges and the rails. Moreover pronounced wear of the flanges can have dangerous consequences in the case of angular application of the sharp edge of the flange to the rail at high speed. Flange-wear is in fact caused by transverse motion of the axles, caused by the nosing motion or by other causes: changes in the plane, profile or shape of the rail, curves and so on. It will be appreciated that it will have a favourable influence on the critical speed and on flange-wear if conttact between the flanges and the inside surfaces of the rails can be avoided.

Another possibility for increasing the critical speed is to increase the wheel-base of the bogie. Increasing the wheel-base of the bogie however has the effect of increasing its mass, which is not favourable to raising the critical speed. It also gives rise to problems during passage around curves. It will therefore be appreciated that it would be advantageous to increase the guiding-base without corresponndingly increasing the inter-axle wheel-base.

It has already been attempted to improve transverse guiding of the axles of a bogie with a guiding-base greater than the inter-axle wheel-base.

Thus French Patent No. 1 499 183 describes a system for guiding the bogie with jets of pressurized air directed against the inside surfaces of the rails. This apparatus has the disadvantage of consuming a large quantity of compressed air.

There exists another possibility for guiding the bogie transversely. A centering effect is in fact obtained on a railway bogie described in French Patent No. 1 526 883 which is equipped with a linear motor formed of a series of primary windings arranged in succession over the rails and out of contact with them, supplied by a polyphase current, the running-rails forming solid linear secondaries. The high magnetic attraction produced between the motor and the rail has an effect on centering and an anti-tipping effect on centering and an anti-tipping effect on curves. The linear motor is arranged between the axles and the return-torque is therefore relatively small. The centering effect is also obtained, during the intermittent braking periods, on a bogie equipped with a linear brake which is a modification of the linear motor obtained by continuously supplying primaries which form a series of alternate poles. This guiding is obviously obtained simultaneously with a braking drag due to eddy-currents.

Electromagnetic guiding systems have been developed for vehicles other than railway bogies, namely for wheel-less overhead runways. The apparatus described in French Patent No. 2 145 948 includes guiding electromagnets which are continuously electrically controlled, mounted longitudinally on a vehicle, under a rail forming an armature, the air-gap being variable as a function of the reciprocal attraction. These electromagnets are mounted offset to each side of the rail forming the armature. As this system must have as constant an air-gap as possible between electromagnets and rails, it has the disadvantage of requiring a powerful electric control with as small a time-constant as possible so as to both suspend and guide the vehicle relative to the rail. The arrangement of the electromagnets permits modification of the supporting force without modifying the centering, provided that the restoring torque is corrected by immediately energizing one or other of the arrays of electromagnets concerned.

According to the present invention there is provided an electromagnetically guided railway rolling element, comprising a plurality of electromagnets each arranged outside the inter-axle wheel-base of the element, each positioned such that, in use, it overlies a rail and is separated therefrom by an air-gap, and each including two poles aligned transversely of the rails; and means for connecting the electromagnets to the axle-boxes of the element in a manner to prevent transverse movement therebetween.

The invention will be better understood from the following description of preferred embodiments thereof, given by way of example only, reference being had to the accompanying drawing wherein:

FIG. 3 is a section along the line I—I of FIG. 1 or FIG. 2;

FIG. 4 is a view of a detail of a rolling element, showing the axle off-centre in relation to the rails;

FIG. 5 is a section along I—I of FIG. 1 or FIG. 2 showing a second arrangement of guiding electromagnets;

FIG. 6 is a section along I—I showing a modification of the system for attaching the electromagnets to the rolling element.

Figure 1:
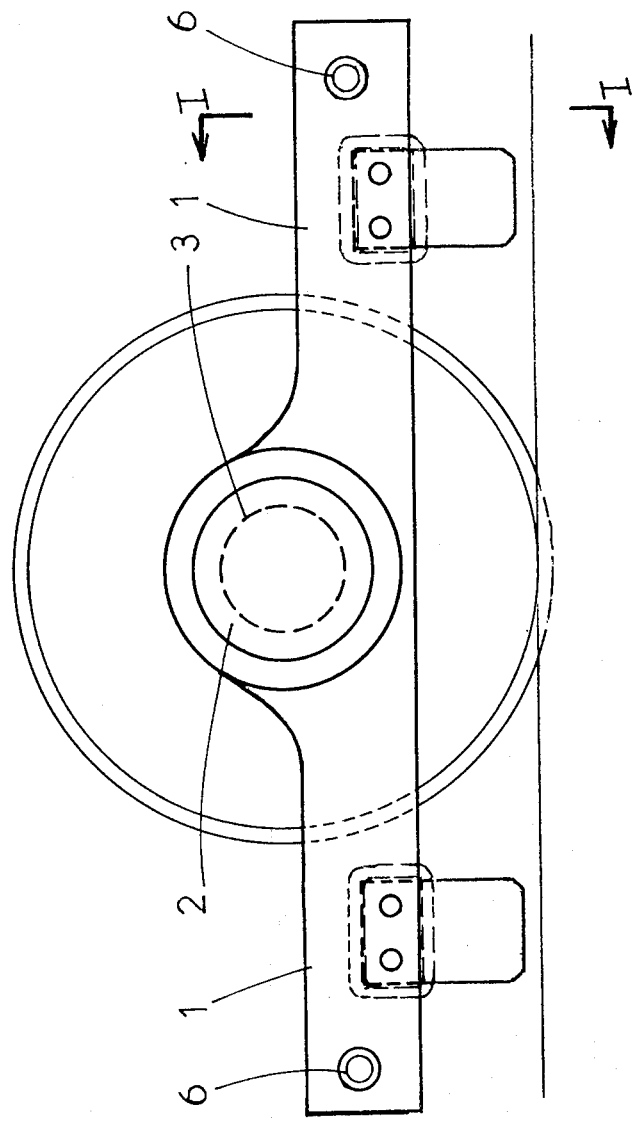
FIG. 1 is a side-elevation of an embodiment of rolling element in accordance with the invention.
Figure 2:
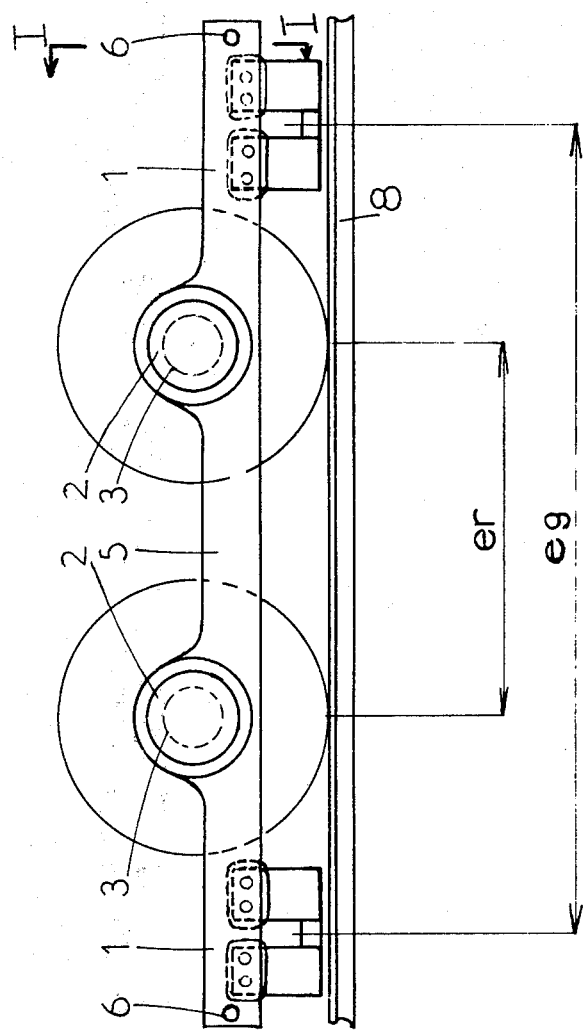
FIG. 2 is an external side-elevation of a second embodiment of rolling element in accordance with the invention.

The rolling element includes side brackets 1 fast with the axle-boxes 2 of the axle 3 shown in FIGS. 1 and 3, or mounted on the axles 3 of the bogie shown in FIGS. 2 and 3. In the case of a bogie, the axle boxes are connected by intermediate members 5 known as equalizing-bars which form a quadrangle with the axles 3. The equalizing-bars and the brackets 3 may be formed in one piece.

These brackets 1 form part of an underframe including also end members 6 and side members 7, the said under-frame supporting the electro-magnets 10 and 11 over the rails 8 and 9 respectively, for example by means of tubes 13. The connections between the axle-boxes and the electromagnets is rigid in order to prevent transverse movement therebetween. The electromagnets 10 and 11 are arranged on either side of the axle or axles, in such a way that the guiding-base e g is greater than the inter-axial wheel-base e r.

Each of the electromagnets 10 and 11 has a core 12 including arms directed and inclined towards the head of the rail and which carries at least one winding 14 having its axis at right angles to the axis of the rail. The opposed north and south poles, referenced 121 and 122 respectively, are aligned transversely of the rails. The north poles 121 and south poles 122, are, on the other hand, aligned parallel to the rails and are symmetrical with respect to the median planes of the rails. The successive north or south poles are connected in pairs by a soft iron block to avoid interference. It may be noted that this pole arrangement avoids the generation of large eddy-currents which would produce a braking effect. An arrangement with the north-south poles aligned parallel to the rails, i.e. in accordance with the one described in the above-mentioned French Patent No. 1 526 883, would on the contrary give rise to a large braking force.

The forces produced between the two arms of each electromagnet 10 or 11 and the associated rail are inclined and resolve into vertical attraction forces and horizontal guiding forces $T_1$ and $T_2$. These forces become increasingly large as the arms of the cores 12 are more inclined. If the axles are perfectly centred on the track, the resultant of the guiding forces $T_1$ and $T_2$ applied to a same electromagnet is zero. If the axles are off-centre, as shown in FIG. 4, the guiding forces $T_1$ are greater than the guiding forces $T_2$ for the electromagnets 11 and the guiding forces $T_2$ are greater than the guiding forces $T_1$ for the electromagnets 10. The resultants tend to recentre the axles.

In the embodiment shown in FIG. 5, the magnetic cores 12 are offset relative to each other, symmetrically about the median planes of the rails. The poles 121 and 122 are not exactly in line, but are offset symmetrically relative to the vertical median planes of the rails, alternately to the right and to the left. For the electromagnets 10 and 11 offset inwardly of the rails, the guiding forces $T_2$ are greater than the guiding forces $T_1$ which are directed inwardly. For the electromagnets 10 and 11 offset outwardly of the rails, on the contrary, the guiding forces $T_1$ are greater than the guiding forces $T_2$. As the electromagnets 10 and 11 are equal in number the overall resultant is zero in the centred position of the rolling element.

In other modifications (not shown), the electromagnets 10 and 11 are all offset either inwardly of the rails or outwardly of the rails. This arrangement enables initial guiding forces to be obtained, acting towards the centred position.

FIG. 6 shows a particular apparatus for attachment of the electromagnets. The magnetic cores 12 are suspended in cages 14 themselves suspended from rods 13 by means of elastic bushes 15. The air-gap between the cores 12 and the rails is determined in the normal position by the stops 16 which are applied to the cages 14 by the action of the springs 17. Upon accidental contact of one of the cores with the rail, the said core can lift so that only that core is then subjected to frictional stresses and vibrations. The connections between the electromagnets and the axle-boxes are obviously transversely rigid.

It will be appreciated that without departing from the scope of the invention modifications and improvements to detail may be devised and the use of equivalent means considered. Thus the forms and arrangement of the cores of the electromagnets may be different to obtain the required pole arrangements.

The above described embodiment of the invention provides an apparatus for electromagnetically guiding a rolling element, having a guiding-base greater than the inter-axle wheel-base, without too much increase in mass, which allows an increase in the critical speed. This guiding system by itself gives restoring torques with a relatively steep and substantially linear initial rise in the restoring force up to the limit at which the wheel-flanges engage the rails. This guiding apparatus leads to a decrease in the frequency and intensity of mechanical contact between the wheel-flanges and the rails. There is consequently a reduction in the wearing away of the profile. The risk of flanges which have become sharp-edged, which are dangerous at high speeds, is eliminated. The embodiment also provides an electromagnetic guiding apparatus which co-operates with the conicity of the wheel-tyres and the slope of the rails to centre the rolling element and which does not require continuous electric control. The rolling element enables as small as possible an air-gap to be maintained mechanically between the electromagnetic guiding apparatus and the rails, which condition is favourable to obtaining large guiding forces.

What is claimed is:

1. An electromagnetically guided railway rolling element, comprising a plurality of electromagnets outside an interaxle wheelbase of the element, each of said magnets being positioned such that, in use, it overlies a rail and is separated from the rail by an air-gap, two poles for each of said magnets which are aligned transversely of the rails and are offset relative to a vertical medial plane of the rail; and means for connecting said electromagnets to axle-boxes of the element preventing transverse movement therebetween.

2. A rolling element in accordance with claim 1, wherein said electromagnets are alternately offset to the right and the left relative to median planes of the rails.

3. A rolling element in accordance with claim 1, including elastic bushes connecting said electromagnets to the axle-boxes.

4. A rolling element in accordance with claim 1, including means for guiding said electromagnets for vertical movement; elastic means for biasing said electromagnets towards the rails; and stop means for limiting the movement of said electromagnets towards the rails to determine, in use, the size of the air-gap.

* * * * *